(12) United States Patent
Hayton (10) Patent No.: US 11,153,344 B2
(45) Date of Patent: Oct. 19, 2021

(54) ESTABLISHING A PROTECTED COMMUNICATION CHANNEL

(71) Applicant: TRUSTONIC LIMITED, Cambridge (GB)

(72) Inventor: Richard Hayton, Cambridge (GB)

(73) Assignee: TRUSTONIC LIMITED, Cambridge (GB)

( * ) Notice: Subject to any disclaimer, the term of this patent is extended or adjusted under 35 U.S.C. 154(b) by 111 days.

(21) Appl. No.: 16/568,597

(22) Filed: Sep. 12, 2019

(65) Prior Publication Data

US 2020/0092330 A1 Mar. 19, 2020

(30) Foreign Application Priority Data

Sep. 17, 2018 (GB) ..................................... 1815092

(51) Int. Cl.
*H04L 29/06* (2006.01)
*H04L 9/08* (2006.01)
*H04L 9/06* (2006.01)

(52) U.S. Cl.
CPC ............ *H04L 63/18* (2013.01); *H04L 9/0643* (2013.01); *H04L 9/0827* (2013.01);
(Continued)

(58) Field of Classification Search
None
See application file for complete search history.

(56) References Cited

U.S. PATENT DOCUMENTS

2006/0251256 A1\* 11/2006 Asokan ................. H04W 12/50
380/270

FOREIGN PATENT DOCUMENTS

GB          2 421 410       6/2006
KR    10-2007-0111684      11/2007

OTHER PUBLICATIONS

"Shahid Raza, Ludwig Seitz, Denis Sitenkov, and Goran Selander, S3K Scalable Security With Symmetric Keys-DTLS Key Establishment for the Internetof Things, Jul. 2016, IEEE Transactions on Automation Science and Enginerring, vol. 13" (Year: 2016).\*

(Continued)

*Primary Examiner* — Jeffrey C Pwu
*Assistant Examiner* — Mayasa A Shaawat
(74) *Attorney, Agent, or Firm* — Nixon & Vanderhye P.C.

(57) ABSTRACT

To establish a first protected communication channel between a device D and a first server S, a symmetric key $K_S$ is derived at the device D, based on a device identifying key $K_D$ and public key information dependent on a first server public key $S_{public}$ of the first server S. The symmetric key $K_S$ is derived in a corresponding way at a second server T. The symmetric key $K_S$ is transmitted from the second server T to the first server S on a second protected communication channel. Communication on the first protected communication channel between the device D and the first server S is protected using a communication key $K_C$ which is dependent on the symmetric key $K_S$. This can enable a device D lacking support for asymmetric key cryptography to securely enter into communication with the first server S.

12 Claims, 3 Drawing Sheets

(52) U.S. Cl.
CPC .......... *H04L 9/0866* (2013.01); *H04L 9/0869* (2013.01); *H04L 63/0435* (2013.01); *H04L 63/0442* (2013.01)

(56) References Cited

OTHER PUBLICATIONS

"Hokeun Kim, Armin Wasicek, Benjamin Mehne and Edward A. Lee, A Secure Network Architecture for the Internet of Things Based on Local Authorization Entities, 2016, IEEE 4th International Conference on Future Internet of Things and Cloud" (Year: 2016).*
Combined Search and Examination Report for GB1815092.0, dated Mar. 12, 2019, 5 pages.

\* cited by examiner

ESTABLISHING A PROTECTED COMMUNICATION CHANNEL

This application claims priority to GB Patent Application No. 1815092.0 filed 17 Sep. 2018, the entire contents of which is hereby incorporated by reference.

BACKGROUND

The present technique relates to establishing a protected communication channel between a device and a server.

A protected communication channel may be established to protect transmissions between two devices. For example, the protected communication channel could be based on a public key infrastructure using asymmetric keys. A device may be associated with a private key which it alone has access to and a public key which can be shared with others, and a certificate may be provided attesting to properties of the device associated with the private-public key pair. The key pair can be used to provide assurance of confidentiality (e.g. messages encrypted with the public key can be decryptable only by the device having the private key) and trust in the identity of the device (e.g. the public key can be used by a verifier to verify a signature of a message signed using the private key, so that if the signature verification is successful this means the message can be assumed to have originated from the device holding the private key).

However, the software algorithms supporting asymmetric key cryptography, e.g. elliptic-curve cryptography, can be relatively complex and large in code size. In very small computing devices such as sensors, actuators or other devices in the Internet of Things, memory storage capacity and processing power can be extremely constrained. This may make it infeasible to implement asymmetric key cryptography on such a device. Hence, it can be difficult for a device lacking support for asymmetric key cryptography to establish a protected communication channel with a server with which it has not already shared a symmetric key for protecting communications, while maintaining both confidentiality and trust in the identity of the device.

SUMMARY

At least some examples provide a method for establishing a first protected communication channel between a device and a first server, the first server having a first server public key, and the device having a device identifying key shared with a second server different to the first server; the method comprising: deriving a symmetric key at the device, based on the device identifying key and public key information dependent on the first server public key; deriving the symmetric key at the second server, based on the device identifying key and the public key information; transmitting the symmetric key from the second server to the first server using a second protected communication channel; and protecting communication on the first protected communication channel between the device and the first server using a communication key which is dependent on the symmetric key.

At least some examples provide a set of computer programs for controlling the device, the first server and the second server to perform the method described above.

At least some examples provide at least one storage medium storing the set of computer programs. The storage medium may be a non-transitory storage medium.

At least some examples provide a method for a first server to establish a first protected communication channel with an device, comprising: receiving from a second server, over a second protected communication channel, a symmetric key derived from a first server public key of the first server and a device identifying key shared between the device and the second server; and protecting communication with the device on the first protected communication channel, using a communication key which is dependent on the symmetric key received from the second server.

At least some examples provide a method for a second server to generate a symmetric key for a first server for establishing a first protected communication channel between the first server and a device, comprising: deriving the symmetric key at the second server, based on a device identifying key shared between the second server and the device, and public key information dependent on a first server public key associated with the first server; and transmitting the symmetric key to the first server, over a second protected communication channel.

At least some examples provide a method for a device to establish a first protected communication channel with a first server, comprising: deriving a symmetric key at the device, based on a device identifying key shared with a second server different to the first server and public key information dependent on a first server public key associated with the first server; and communicating with the first server, over the first protected communication channel protected based on a communication key dependent on the symmetric key.

At least some examples provide a computer program for controlling an apparatus to perform any of the methods discussed above. A storage medium may store the computer program. The computer program may be a non-transitory computer program.

At least some examples provide an apparatus comprising processing circuitry to perform data processing, and data storage storing a computer program for controlling the processing circuitry to perform any of the methods discussed above.

BRIEF DESCRIPTION OF THE DRAWINGS

Further aspects, features and advantages of the present technique will be apparent from the following description of examples, which is to be read in conjunction with the accompanying drawings, in which.

DESCRIPTION OF EXAMPLE EMBODIMENTS

A device may need to establish a first protected communication channel with a first server, where the device and the first server do not already have access to secret keys for protecting the first protected communication channel. Hence, it may be necessary to generate keys and share these between the device and the server. However, for memory-constrained devices or devices with limited processing capability, which may lack support for the asymmetric key generation operations used in asymmetric key cryptography, it can be challenging to generate and distribute the keys to the first server securely (with a level of trust that the keys are secure against snooping by third parties). In addition, there may be a requirement to provide the first server with trust in the identity of the device with which it will communication over the first protected communication channel using the key.

In the technique discussed below, the device may exploit the fact that a second server may be able to communicate with the first server over a second protected communication channel, so that a symmetric key can be provided to the second server by the first server and protected against third party access during the transmission. This enables a device lacking support for asymmetric key cryptography to more securely enter into communication with a first server.

Hence, a symmetric key is derived, both at the device and at the second server, based on a device identifying key and public key information. The device identifying key is a value which has previously been shared between the device and the second server. The public key information depends on a first server public key associated with the first server. The second server transmits the symmetric key to the first server on a second protected communication channel. The device and first server can enter into protected communication on the first protected communication channel using a communication key which depends on the symmetric key. Hence, as the second protected communication channel between the first and second servers is protected, this enables more secure distribution of the symmetric key to the first server than would be possible by the device itself. Also, by using the public key information to derive the symmetric key at both the first and second servers, the symmetric key is generated specific to the particular first server with which the device wishes to communicate, rather than being a general key shared between multiple servers, which improves security. Also, by basing the public key information used to generate the symmetric key on the public key of the first server, the second server can obtain the first server's public key either direct from the first server itself or from a third party certifying authority, which eliminates any need for a communication channel to be maintained between the device and second server at the time when entering into communication with the first server, and hence can help to save power which can be important especially for power-constrained devices such as sensors or other small processing devices used in the Internet of Things.

The second protected communication channel may be any channel which ensures authenticity (trust in the identity of the parties communicating) and confidentiality (trust that only the intended recipient of the message can learn the contents of the message). For example, the channel between the first and second servers could be made using a physically secure link, or using a virtual private network (VPN, e.g. using IPSec or SSL), or by encrypting messages using a pre-shared key (PSK), or by using asymmetric key cryptography. Unlike for the first protected communication channel, for which the first device may be incapable of generating asymmetric keys and there may be no pre-shared key material between the device and first server for protecting communications until the method of the present technique is carried out, the second protected communication channel may be secured either by virtue of previously shared material or by physical securing of the communication channel, or by the fact that the first and/or second server may have support for generating asymmetric keys so that a secure channel can be established between the first and second servers.

In some examples, the second protected communication channel may be protected using a public key infrastructure based on asymmetric keys. For example, the second server could encrypt the transmitted symmetric key using the first server's public key, and the message could be decrypted by the first server using the first server's private key (to ensure confidentiality). Alternatively, transmission of a second symmetric key (different to the symmetric key generated by the device and second server) could be protected using the asymmetric keys, and then the second symmetric key could be used to protect the transmission of the (first) symmetric key which will be used by the second server to form the communication key for the first protected communication channel. For example, TLS (transport layer security) may be used, where asymmetric key cryptography is used to share a symmetric key on the second protected communication channel and then the shared symmetric key is used to protect the traffic on the channel itself. Also, messages on the second protected communication channel may be signed to enable authenticity to be verified. Hence, there are a number of ways in which a public key infrastructure could be used to protect the second protected communication channel, but in general this exploits the greater resources at the first/second servers for using asymmetric keys, to allow the less capable device to enter into secure communication with the first server.

If asymmetric keys are used to protect the communication channel between the first and second servers, in some example these asymmetric keys could be an asymmetric key pair in which the public key is different to the first server public key used for generating the symmetric key at the device and the second server.

However, in other examples, the asymmetric keys for the public key infrastructure protecting the second protected communication channel between the first and second servers may comprise the first server public key and a first server private key. That is, the first server public key which is used to derive the symmetric key at the device and the second server may be the same key as the first server public key which is used by the second server to protect the transmission to the first server. For example the second server may encrypt the transmission of the symmetric key using the public key of the first server, so as to ensure that only the first server which has the correct first server private key will be able to decrypt the symmetric key. Alternatively, the asymmetric keys associated with the second protected communication channel may be used to share a second symmetric key between the first and second servers, and then the second symmetric key may be used to protect the transmission of the (first) symmetric key on the second protected communication channel, with the communication key dependent on the (first) symmetric key then being used to protect the first protected communication channel.

Hence by this mechanism the same key information is used both to derive the symmetric key and to protect the transmission of the symmetric key from the second server to the first server. This would be seen as counter-intuitive since in the field of secure processing algorithms it would normally be considered potentially harmful to security to use the same information for two different key distribution purposes. However, by using the same first server public key both for deriving the symmetric key and for protecting the transmission between the second server and the first server, the key generated for communicating with a particular server can be ensured to be both specific to that particular server and shared only with that particular server, since only the first server having the first server private key can read the symmetric key transmitted from the second server, and the public key infrastructure may provide a certificate attesting to the identity of the first server so that trust can be increased for the device.

In some implementations the communication key which is used to protect communication on the first protected communication channel between the device and the first server may be the same as the symmetric key which is generated at the device and the second server. This approach may be simplest to implement and may be acceptable if the second server can be trusted (e.g. the second server may be operated by a trusted certifying authority or device validation service provider).

However in other examples the communication key may be different to the symmetric key. For example the communication key may be derived from the symmetric key based on information shared between the device and the first server. In this way the key used to protect the actual communication on the first protected communication channel between the device and the first server may be hidden from the second server. Any post-processing function applied to the symmetric key (based on the information shared between the device and the first server) may be used to generate the communication key. For example additional hash functions may be applied. The information shared between the device and the first server could for example comprise at least one of: a class key associated with a class of devices including a device (e.g. a secret known to all devices in the class but not known to the second server) and/or a random or pseudorandom value. For example the random of pseudorandom value could be transmitted by the device to the server through a communication route that the second server does not have access to. For example the random or pseudorandom number could be transmitted in encrypted form encrypted by the first server public key.

In some examples the public key information which is used by both the device and the second server to derive the symmetric key may be exactly the same as the first server public key itself. Hence, in some cases the entire public key of the first server could be an input parameter to the function used to derive the symmetric key.

However, in other examples the public key information could comprise a hash of the first server public key, which has fewer bits than the first server public key itself. The keys used in asymmetric key cryptography are typically very long and so to reduce memory storage requirements and remove the need for the device to know the full and potentially large public key of the first server, instead the device could be provided with a hash of the first server's public key. The second server may also obtain the same hash of the first server's publicity, and use it to derive the symmetric key.

The device identifying key may be any value specific to the device. For example it could be a device identifier embedded in the device during manufacture, or a random number generated within the device. The device identifying key can be shared with the second server in a number of different ways. In one example if the factory or adaptation station which provided the device with its device identifying key knows the public key of the second server then it can encrypt the device identifying key with the second server's public key and then the second server will be able to decrypt the device identifying key using its private key. The transmission of the device identifying key from the factory or adaptation station and could be signed by a private key associated with the factory or adaptor to attest to the fact that this is a valid device identifying key. This transmission may associate the device identifying key with some other identifier associated with the device so that later the second server, which may store device identifying keys for a number of different devices, can look up the appropriate device identifying key for the particular device which the first server needs to communicate with.

In an alternative approach for sharing the device identifying key with the second server, the device may send an encrypted and signed message to the second server containing the device identifying key and a corresponding identifier of the device, which is encrypted using the second server's public key and signed using a public key associated with the factory or adaptation station where the device was made or authenticated. This can enable the device to have trust that only the second server can decrypt its device identifying key, and the second server to have trust that the received device identifying key came from a device with an attested identity. This trust in the device by the second server may then also extend to the first server when entering into communication with the device over the first protected communication channel.

The device may be incapable of generation of asymmetric keys (e.g. elliptic curve computations) for supporting a public key infrastructure. The algorithms for generating pairs of asymmetric keys are typically extremely complex and require a large amount of memory storage as well as power to run. This may be infeasible for a low cost Internet of Things device which may have extreme constraints on memory capacity and power budget.

In one example, the device may derive the symmetric key and then send a payload message to the first server on the first protected communication channel protected using the communication key, and then in response to the payload message the first server may send a key generation request to the second server to trigger the second server to derive the symmetric key and transmit the symmetric key to the first server over the second protected communication channel. Hence, one advantage of the method discussed above is that it enables the device to use a "fire and forget" approach where it only needs to send one message to the first server, which is already protected using the communication key, and this payload message may trigger the first server to obtain the symmetric key from the second server without needing to communicate with the device again. This can be very useful for Internet of Things type devices which may be battery-powered, for which conserving power can be extremely important to improve battery lifetime. In contrast, with alternative techniques where the key is generated on the server instead of at the device then the device would have to request a communication and then later receive the key back from the servers and then start communicating which would imply multiple messages needing to be sent.

Both the payload message from the device to the first server, which initiates the communication, and the key generation request from the first server to the second server, which triggers the second server to derive the symmetric key, may specify a device identifier of the device. The second server may store a record of device identifying keys associated with a number of different devices having different device identifiers. Hence, the device identifier included in the key generation request enables the second server to locate the correct device identifying key for the device which wants to communicate with the first server, and to generate the appropriate symmetric key for that device.

Figure 1:
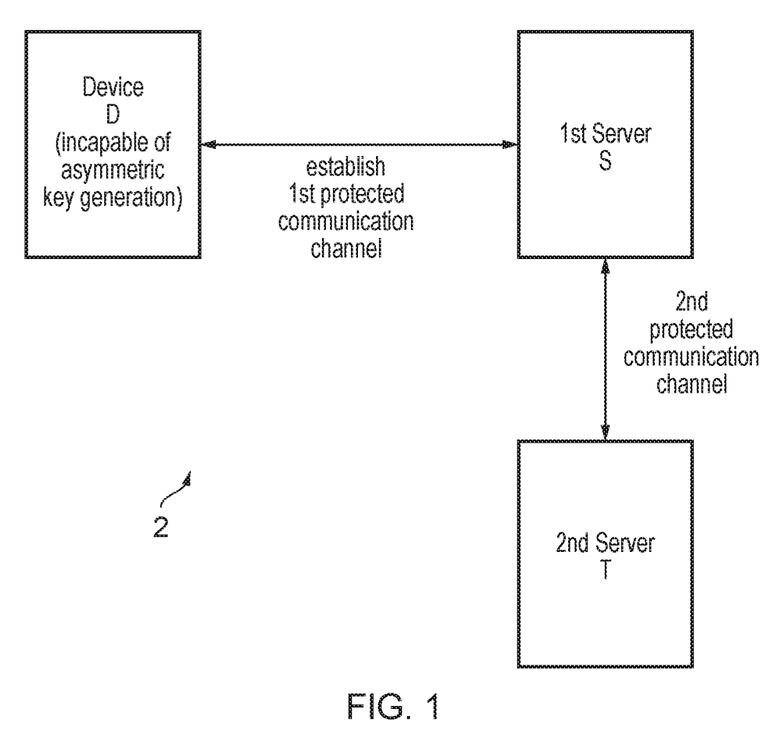
FIG. 1 schematically illustrates a system comprising a device, a first server and a second server.

FIG. 1 schematically illustrates a system 2 comprising a computing device D, a first server S and a second server T. The device D may for example be a device in the Internet of Things (IoT), for example a temperature sensor within a heating or air-conditioning system, an actuator for controlling street lighting, or a heart rate sensor worn by a patient which feeds back data to a medical computing system, for example. It will be appreciated that these are just some examples of possible uses of the devices. The first server S may be the cloud platform run by the service provider which is using the data from the device D, such as a healthcare provider, banking system or public services provider. The second server T may be a validation server maintained by a security platform managing service which may provide an authentication service supporting the first server S to determine which devices D can securely be communicated with.

The device D may wish to establish a first protected communication channel with the first server S but may be incapable of generating asymmetric keys which could be used to secure communication on the first protected communication channel. However the first server S and the second server T may communicate over a second protected communication channel which is protected to provide authenticity and confidentiality, e.g. using a public key infrastructure (PKI) based on asymmetric keys, a physically secure channel, a VPN, or based on pre-shared key material.

Figure 2:
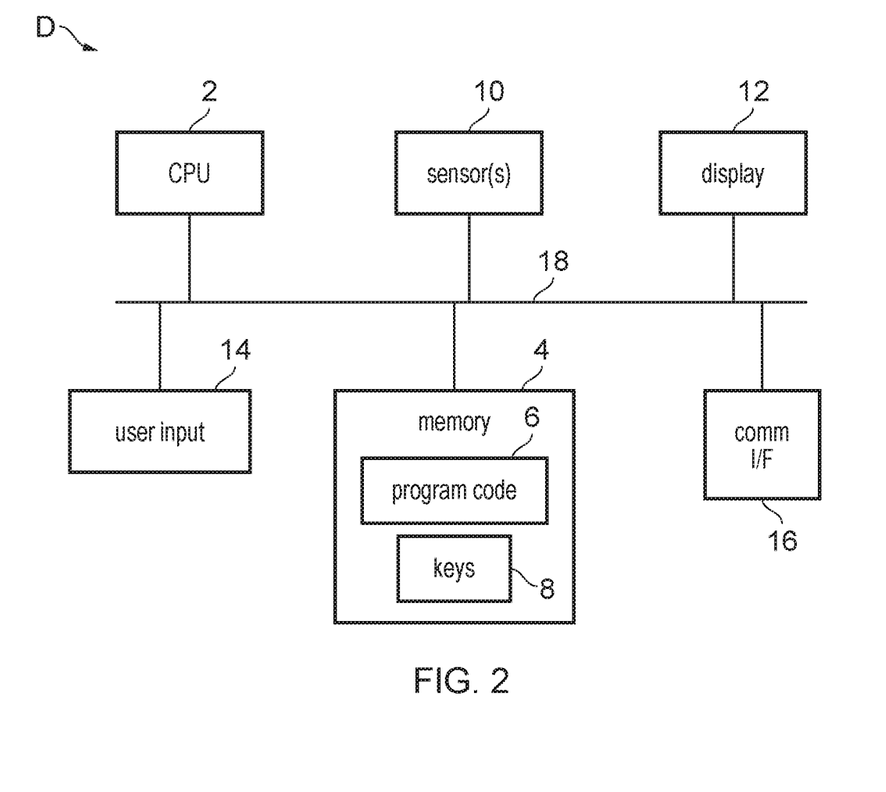
FIG. 2 schematically illustrates an example of components of the device.

FIG. 2 schematically illustrates an example of the device D, which has processing circuitry (e.g. a central processing unit (CPU)) 2, and storage circuitry 4 (memory) for storing data and, program code 6 executed by the processing circuitry 2. The memory 4 may also store keys 8 or certificates associated with a public key infrastructure. Clearly, other data may also be stored within the memory 4. In some cases, the memory 4 may be partitioned into secure and less secure regions, with the secure region for example being accessible only from a trusted execution environment of the processing circuitry 2, while the less secure regions are accessible from both a trusted execution environment and a normal execution environment of the processing circuitry 2. Transitions of the processing circuitry 2 between the trusted execution environment and normal execution environment may be monitored and controlled according to a hardware architecture such as the TrustZone® architecture provided by Arm® Limited.

The device D may also have one or more sensors 10 for sensing external conditions such as temperature, pressure, infrared radiation, etc., a display 12 for displaying information to a user, a user input 14 for accepting input gestures from a user, and a communications interface 16 for communicating with other devices, for example through wireless protocols such as WiFi®, Bluetooth® or NFC, or through wired communications (e.g. Ethernet). The various elements 2, 10, 12, 14, 4, 16 may communicate over at least one bus 18.

It will be appreciated that FIG. 2 is just one example of a possible architecture for the device D and other examples may have many other components not shown in FIG. 2. Also, in some examples the device D may not have any display 12 and/or user input 14. For example, some Internet of Things devices may merely sense information about their surroundings and communicate the sensed information (or data derived from the sensed information) to an external device, so may not need any user interface or display. Also, in some devices, in addition to (or instead of) the sensors 10, a control unit or actuator may be provided to trigger a related control function, such as control of a lighting or heating system, or sounding of an alarm.

The first and second servers S, T may also have a CPU 2, memory 4 and communication interface 16 similar to that shown in FIG. 2. However, in comparison to the device D, the processing circuitry 2 of the servers S, T may be more powerful (capable of executing at a higher frequency and/or instruction throughput) than the processing circuitry 2 in the device D. Similarly, the capacity of the memory 4 in the servers S, T may be much greater than the capacity of the memory 4 in the device D. For example, the device D may be extremely memory-constrained and so many only have of the order of a few hundred kB of persistent storage. Also, the servers S, T need not include a sensor 10, display and/or user input 14 as shown in FIG. 2.

Figure 3:
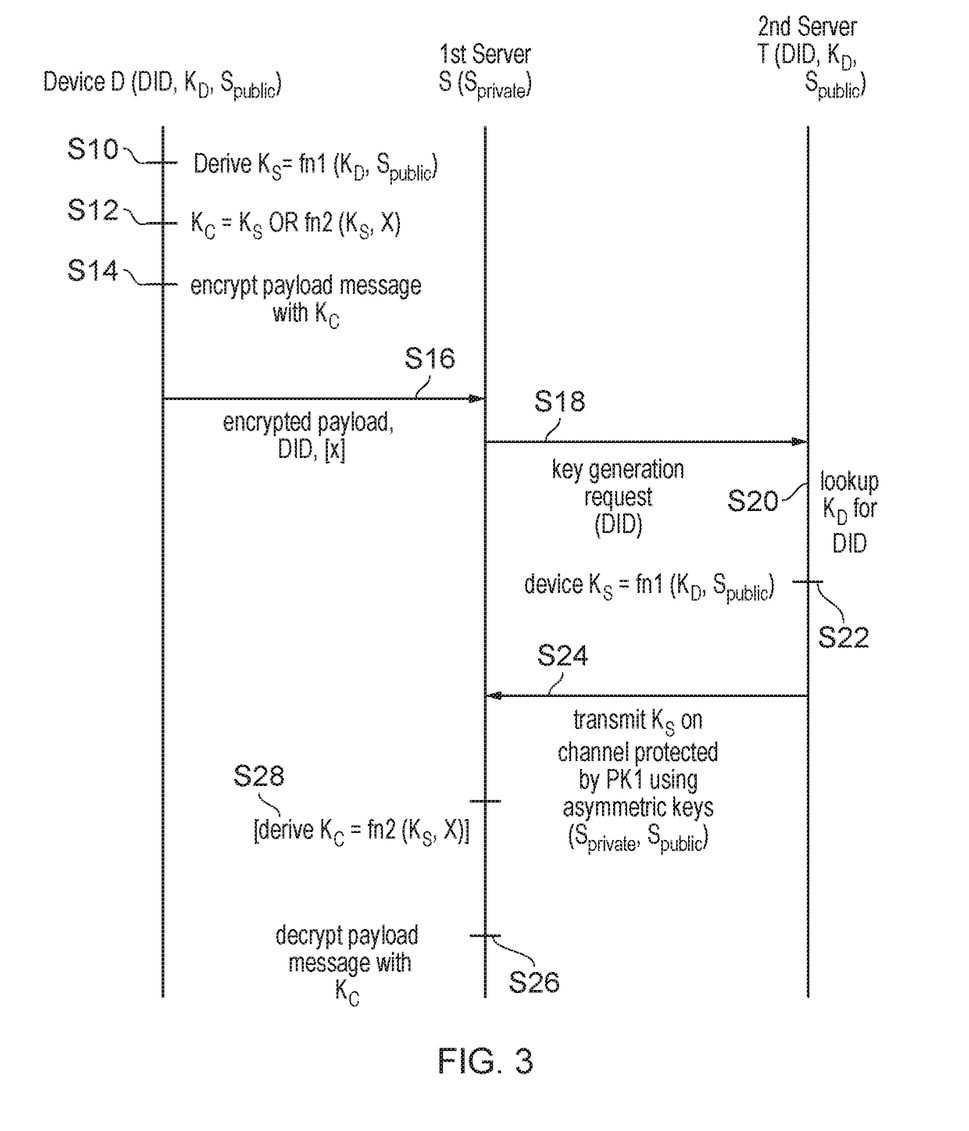
FIG. 3 illustrates a method for establishing a first protected communication channel between the device and the first server.

FIG. 3 illustrates a method for the device D and the first server S to establish a first protected communication channel 4, with confidence that the device D can trust that only the first server S is able to read its messages, and with the first server S having trust that the messages are coming from the correct device D.

Prior to performing the method of FIG. 3, the device D and the second server T have shared information specifying a device identifier (DID) identifying the particular device D and a device identifying key $K_D$ which is any secret information held by the device D, for example a randomly or pseudorandomly generated number. In some examples the device identifying key $K_D$ may be generated in a factory and embedded into device D and also uploaded in the secure manner to the second server T (with asymmetric keys associated with the factory protecting the communication the DID and $K_D$ to the second server T).

Alternatively, the device identifying key $K_D$ may be generated within the device D itself, for example by a random or pseudorandom number generator, which can provide greater security. In this case the device D may generate a message comprising the device identifier DID and device identifying key $K_D$ and encrypt the message using a private key associated with the second server, $T_{public}$, as well as signing the message with a factory public key $F_{public}$. On receipt of this message the second server T can then verify based on the signature provided using the factory key that the device is attested and can be trusted and can decrypt the message using its own private key $T_{private}$ so as to guarantee that only the second server T can receive the information tying the device's identify (DID) to the secret key $K_D$ which the device will use.

The second protected communication channel between the first server S and the second server T is protected in this particular example through a public key infrastructure (PKI) based on an asymmetric key pair associated with the first server S, which comprises a private key $S_{private}$ held by the first server S and a public key $S_{public}$ which is made available to the second server T and the device D. In some cases, the device D need not see the full public key of the first server, and instead could receive a reduced size hash of $S_{public}$. At step S10 of FIG. 3, the device D derives a symmetric key $K_S$ based on a first hash function fn1, of information including the device identifying key $K_D$ and the first servers public key $S_{public}$ (or the hash of $S_{public}$). At step S12 the device D derives a communication key $K_C$ which will be used to protect the communication on the communication channel between device D and first server S. This communication key $K_C$ could either be the same as the symmetric key $K_S$, or could be generated by applying a further hash function, fn2, to information including the symmetric key $K_S$ and shared information X which will be shared with the first server S through a mechanism which is not accessible to the second server T. If the second server T can be trusted then it may be acceptable for the second server T to know the communication key $K_C$ which will be used on the channel between device D and first server S, and in this case it may be acceptable for $K_C$ to be equal to $K_S$. However if further security is needed then additional information X shared with first server S may be used to hash $K_S$ to generate $K_C$. For example the shared information X could be a random or pseudorandom number generated by the device D, or could be a class identifier which is specific to a class of devices including device D. The second hash function fn2 could be a different hash function to the first hash function fn1, or alternatively functions fn1, fn2 could be the same hash function (e.g. SHA256).

At step S14 the device D encrypts its payload message, which it wishes to transmit to the first server S, based on the communication key $K_C$ generated at step S12. At step S16 the device D transmits the encrypted payload message, the device identifier DID, and optionally the shared information X, to the first server S. As the encrypted payload at step S16 includes the actual information which the device D wishes to send to the first server S, and this is the first message initiated since the symmetric key $K_S$ was derived, there is no need for any preliminary communication with the first server S to establish the communication key $K_C$ before the payload is sent. This is useful for IoT power constrained devices as the "fire and forget" approach means that the number of times the device D needs to power up its communication unit 16 can be reduced which is helpful for saving power and prolonging battery life. The encrypted payload S16 could in some cases also be encrypted based on the first server's public key $S_{public}$ to ensure that it can only be read by the first server S by decrypting the message using the first server's private key $S_{private}$. This can be useful for example if the message includes the shared information X which needs to be hidden from the second server T or others.

In response to receiving the encrypted payload at step S16, at step S18 the first server transmits a key generation request to the second server T, which specifies the device identifier DID received with the payload. In response, at step S20 the second server T looks up in its device database the entry corresponding to the specified device identifier DID and obtains the device identifying key $K_D$ which was previously shared between the device D and the second server T. At step S22 the second server T derives the symmetric key $K_S$ using the same hash function fn1 as at step S10, based on the device identifying key $K_D$ and the first server's public key $S_{public}$ (or the hash of $S_{public}$). At step S24 the second server T generates a protected data transmission containing the symmetric key $K_S$, which is protected using the asymmetric key pair $S_{private}$, $S_{public}$. For example the transmission of $K_S$ is encrypted using the first server's public key $S_{public}$. On receipt the first server decrypts the message using its private key $S_{private}$ and hence obtains the symmetric key $K_S$. If the communication $K_C$ equals $K_S$ at step S12 then the symmetric key $K_S$ obtained by the first server S at step S24 can simply be used as the communication key $K_C$ and so at step S26 the first server S decrypts the payload received at step S16 using the communication $K_C$. If however at step S12 the device D applied a further hash based on the shared information X then at step S28 the first server S may apply the corresponding hash function fn2 based on the shared information X received at step S16 and then having derived the communication key $K_C$ may decrypt the payload at step S26.

Subsequent communication can then continue between the device D and the first server S, encrypted and decrypted using the communication key $K_C$.

Hence, with this approach the PKI protecting the channel between the first and second servers S, T is leveraged to enhance the security of key distribution between the device D which cannot generate asymmetric keys and the first server S. Since the symmetric key $K_S$ which is used to derive the communication key $K_C$ is derived both based on a device-specific key $K_D$ and based on the first server's public key $S_{public}$, it is specific to the pair of communicating devices and so cannot be reused by a different device D or a different first server S. Since the same information $S_{public}$ is used by the second server T both to derive the symmetric key $K_S$ to be transmitted to the first server S and to protect the transmission on the transmission channel to the first server S, this ensures that only the valid first server S will be able to successfully communicate with the device D using the communication key $K_C$. Also, since the earlier sharing of the device identifier DID and device key $K_D$ between the device D and the second server T may be attested as valid by a factory or other authenticating authority, the first server S can be provided with trust in the identity of the device D.

In the example of FIG. 3, the second protected communication channel is protected by encrypting the symmetric key $K_S$ using the first server's public key $S_{public}$. However, another way of using asymmetric keys to protect $K_S$ would be for the asymmetric key pair $S_{private}$, $S_{public}$ to be used to protect transmission of a temporary symmetric key $K_T$ and then for the transmission of $K_S$ from the second server T to the first server S to be encrypted using the temporary symmetric key $K_T$. The temporary symmetric key $K_T$ could be freshly generated for each key generation request.

Alternatively, the second protected communication channel could be protected in other ways not using asymmetric keys of a PKI, e.g. by a physically secure channel, VPN or by encryption based on pre-shared keys shared earlier between the first and second servers S, T.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A method for establishing a first protected communication channel between a device and a first server, the first server having a first server public key, and the device having a device identifying key shared with a second server different from the first server, the method comprising:
deriving a symmetric key at the device, based on the device identifying key and public key information dependent on the first server public key;
sending, by the device, a payload message to the first server on the first protected communication channel protected using a communication key which is dependent on the symmetric key;
in response to the payload message, the first server sends a key generation request to the second server to trigger the second server to derive the symmetric key and transmit the symmetric key to the first server on a second protected communication channel;
deriving the symmetric key at the second server, based on the device identifying key and the public key information; and transmitting the symmetric key from the second server to the first server using the second protected communication channel.

2. The method of claim 1, in which the second protected communication channel is protected using a public key infrastructure based on asymmetric keys.

3. The method of claim 2, in which the asymmetric keys for the public key infrastructure comprise said first server public key and a first server private key.

4. The method of claim 1, in which the communication key is the same as the symmetric key.

5. The method of claim 1, in which the communication key is derived from the symmetric key based on information shared between the device and the first server.

6. The method of claim 5, in which the information shared between the device and the first server comprises at least one of:
   a class key associated with a class of devices including the device; and
   a random or pseudorandom value.

7. The method of claim 1, in which the public key information is the same as the first server public key.

8. The method of claim 1, in which the public key information comprises a hash of the first server public key, and has fewer bits than the first server public key.

9. The method of claim 1, in which the device is incapable of generation of asymmetric keys for supporting a public key infrastructure.

10. The method of claim 1, in which the payload message and the key generation request each specify a device identifier of the device.

11. At least one non-transitory, computer-readable storage medium storing one or more computer programs, which when executed by one or more data processors in a device, a first server, and a second server different from the first server, cause the one or more data processors to establish a first protected communication channel between the device and the first server, where the first server has a first server public key and the device has a device identifying key shared with the second server by:
   deriving a symmetric key at the device, based on the device identifying key and public key information dependent on the first server public key;
   sending, by the device, a payload message to the first server on the first protected communication channel protected using a communication key which is dependent on the symmetric key;
   in response to the payload message, the first server sending a key generation request to the second server to trigger the second server to derive the symmetric key and transmit the symmetric key to the first server on a second protected communication channel;
   deriving the symmetric key at the second server, based on the device identifying key and the public key information; and
   transmitting the symmetric key from the second server to the first server using the second protected communication channel.

12. A system comprising:
   a device;
   a first server; and
   a second server different from the first server,
   each of the device, the first server, and the second server comprising:
      corresponding processing circuitry to perform data processing; and
      data storage,
   wherein each data storage stores one or more computer programs for controlling corresponding processing circuitry to establish a first protected communication channel between the device and the first server, the first server having a first server public key, and the device having a device identifying key shared with the second server by:
   deriving a symmetric key at the device, based on the device identifying key and public key information dependent on the first server public key;
   sending, by the device, a payload message to the first server on the first protected communication channel protected using a communication key which is dependent on the symmetric key;
   in response to the payload message, the first server sends a key generation request to the second server to trigger the second server to derive the symmetric key and transmit the symmetric key to the first server on a second protected communication channel;
   deriving the symmetric key at the second server, based on the device identifying key and the public key information; and
   transmitting the symmetric key from the second server to the first server using the second protected communication channel.

* * * * *